United States Patent
Lee et al.

(10) Patent No.: US 9,171,235 B2
(45) Date of Patent: Oct. 27, 2015

(54) IMAGE FORMING APPARATUS, HOST APPARATUS, AND METHOD FOR PRINTING OUT WEB PAGE THEREWITH

(75) Inventors: Hee-ran Lee, Seoul (KR); Hyung-jong Kang, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 841 days.

(21) Appl. No.: 12/368,475

(22) Filed: Feb. 10, 2009

(65) Prior Publication Data
US 2010/0014103 A1 Jan. 21, 2010

(30) Foreign Application Priority Data
Jul. 16, 2008 (KR) .................... 2008-69012

(51) Int. Cl.
G06F 3/12 (2006.01)
G06K 15/02 (2006.01)
H04N 1/00 (2006.01)

(52) U.S. Cl.
CPC .............. G06K 15/02 (2013.01); G06F 3/1205 (2013.01); G06F 3/1242 (2013.01); G06F 3/1246 (2013.01); G06F 3/1256 (2013.01); G06F 3/1271 (2013.01); G06F 3/1285 (2013.01); G06F 3/1296 (2013.01); G06F 3/1297 (2013.01); H04N 1/00204 (2013.01)

(58) Field of Classification Search
USPC .............. 358/1.15, 1.13, 1.16, 1.18
See application file for complete search history.

(56) References Cited

U.S. PATENT DOCUMENTS

| | | | |
|---|---|---|---|
| 5,991,514 A * | 11/1999 | Nielsen | 358/1.14 |
| 6,115,137 A * | 9/2000 | Ozawa et al. | 358/1.6 |
| 7,088,465 B2 * | 8/2006 | Bates et al. | 358/1.15 |
| 7,271,924 B1 * | 9/2007 | Takamizawa et al. | 358/1.14 |
| 7,706,010 B2 | 4/2010 | Ko et al. | |
| 2003/0020945 A1 | 1/2003 | Lopez et al. | |
| 2005/0099650 A1 * | 5/2005 | Brown et al. | 358/1.15 |
| 2006/0290976 A1 * | 12/2006 | Ko et al. | 358/1.15 |

FOREIGN PATENT DOCUMENTS

| | | |
|---|---|---|
| JP | 2006-1287 | 1/2006 |
| KR | 10-0526109 | 10/2005 |
| WO | WO 97/50243 | 12/1997 |

OTHER PUBLICATIONS

Office Action issued by the Korean Intellectual Property Office on Mar. 26, 2014 in corresponding Korean patent application No. 10-2008-0069012.

* cited by examiner

*Primary Examiner* — Vu B Hang
(74) *Attorney, Agent, or Firm* — Staas & Halsey LLP

(57) ABSTRACT

An image forming apparatus capable of printing out a web page displayed on an host apparatus. An image forming apparatus includes a sheet-supplying cassette to store a printable medium thereon, an input key to input a command for printing out the web page, an interface to transmit the command for printing out the web page to the host apparatus, and receive print data converted to fit onto the printable medium stored on the sheet-supplying cassette from the host apparatus if the input key is selected, and an image forming unit to print out the received print data on the printable medium. Therefore, a user can conveniently prints the web page.

24 Claims, 11 Drawing Sheets

IMAGE FORMING APPARATUS, HOST APPARATUS, AND METHOD FOR PRINTING OUT WEB PAGE THEREWITH

CROSS-REFERENCE TO RELATED APPLICATION

This application claims all benefits accruing under 35 U.S.C. §119 from Korean Patent Application No. 2008-69012, filed on Jul. 16, 2008, in the Korean Intellectual Property Office, the disclosure of which is incorporated herein by reference.

BACKGROUND OF THE INVENTION

1. Field of the Invention

Aspects of the present invention relate to an image forming apparatus, a host apparatus, and a method for printing out a web page therewith, and more particularly, to an image forming apparatus to print out a web page using an input key provided on the image forming apparatus, a host apparatus, and a method for printing a web page therewith.

2. Description of the Related Art

As super high-speed networks have become increasingly widespread, the Internet has become common in companies, schools, and homes.

Many organizations of different kinds, including companies, organizations, schools, or homes manage one or more web pages, and a wide range of web services are provided, such as online banking services to conduct financial transactions, web sites for e-commerce, Internet portals, mailing services, personal home pages, blogs, or cyber cafes. Displaying a range of content using such web services in order to provide information efficiently is a serious issue, and various programming languages or software are used to display the web content including HyperText Markup Language (HTML), JavaScript, Active Server Pages (ASP), ActiveX, or Flash. A user viewing the web pages may desire to identify, confirm, refer, or transfer information accurately and reliably by printing or storing the web pages.

The Internet may be used to obtain various kinds of information, and may be accessed using a web browser such as Internet Explorer. Generally, when a web page is printed using functions provided by the web browser, a user must set the paper size, and determine whether to print headers and footers according to the web browser. However, a web browser is configured to deliver or search for information, such that a web page may be cut off or unexpected pages may be printed or stored. Therefore, a user may not be able to obtain desired information.

Accordingly, an apparatus for easily printing a web page and a method thereof are needed to print a web page more easily and conveniently.

SUMMARY OF THE INVENTION

Aspects of the present invention relate to an image forming apparatus to print out a web page using an input key provided on the image forming apparatus, a host apparatus, and a method for printing a web page thereof.

Additional aspects and/or advantages of the invention will be set forth in part in the description which follows and, in part, will be obvious from the description, or may be learned by practice of the invention.

According to an aspect of the present invention, there is provided an image forming apparatus capable of printing out a web page displayed on an host apparatus, the image forming apparatus including a sheet-supplying cassette to store printable media thereon; an input key to input a command for printing out a web page displayed on the host apparatus; an interface to transmit the command for printing out the web page to the host apparatus, and receive print data converted to fit onto a printable medium stored on the sheet-supplying cassette from the host apparatus if the input key is selected; and an image forming unit to print out the received print data on the printable medium.

According to an aspect of the present invention, the converted print data may be processed such that the web page is included on a designated area of a single printable medium or on areas of a plurality of printable media.

According to an aspect of the present invention, the interface may transmit at least one of either a device information or information regarding the size of a printable medium corresponding to the image forming apparatus together with the command for printing out the web page.

According to an aspect of the present invention, there is provided a host apparatus, including an interface to receive a command for printing out a web page from an image forming apparatus; a display unit to display the web page; a data processing unit to automatically adjust the web page currently displayed on the display unit to fit onto a designated area on a printable medium, and generate print data; and a controlling unit to control operations of the data processing unit according to the command for printing out the web page, transmit the print data generated by the data processing unit to the image forming apparatus, and controls the image forming apparatus to print out the print data.

According to an aspect of the present invention, the data processing unit processes at least one web page to be included on a printing area of a single printable medium or on printing areas of a plurality of printable media.

According to an aspect of the present invention, the controlling unit may periodically poll information of the image forming apparatus, and determine whether the command for printing out the web page is received.

According to an aspect of the present invention, the data processing unit may include a screen capture unit to perform a scroll capture on the web page displayed on the display unit; an image adjusting unit to adjust data of the scroll captured web page to fit onto a printing area; and a printer driver to convert the adjusted data into printable data.

According to an aspect of the present invention, if a plurality of web pages are displayed on the display unit, the controlling unit may transmit print data of a foremost web page among the plurality of web pages or transmit print data of the respective web pages to the image forming apparatus.

According to an aspect of the present invention, if the web page is an advertisement web page, the controlling unit may determine characteristics of the web page, and control the data processing unit to not generate the print data corresponding to the advertisement web page.

According to an aspect of the present invention, the display unit may display a printing menu to adjust printing information regarding the print data.

According to an aspect of the present invention, there is provided a printing method of an image forming apparatus capable of printing out a web page displayed on a host apparatus, the method including if an input key to input a command for printing out the web page is selected, transmitting the command for printing out the web page to the host apparatus; converting the web page to fit onto a printable medium applied to the image forming apparatus; generating print data according to the command for printing out the web page; and printing out, by the image forming apparatus, the print data on the printable medium.

According to an aspect of the present invention, the generated print data may be processed such that the web page is included on an area of a single printable medium or on areas of a plurality of printable media.

According to an aspect of the present invention, the transmitting of the command may transmit at least one of device information and information regarding the size of printable medium corresponding to the image forming apparatus together with the command for printing out the web page.

According to an aspect of the present invention, the method may further include periodically polling, by the host apparatus, device information of the image forming apparatus; and determining whether the command for printing out the web page is received.

According to an aspect of the present invention, the generating may include performing a scroll capture on the web page displayed on the display unit; adjusting data of the scroll captured web page to fit onto a printing area; and converting the adjusted data of the scroll captured web page data into the print data.

According to an aspect of the present invention, the generating may further include generating print data of a foremost web page displayed among a plurality of web pages displayed or generating print data of the respective web pages displayed to the image forming apparatus if the plurality of web pages are displayed.

According to an aspect of the present invention, if a web page is an advertisement web page, the generating may determine characteristics of a web page displayed on the display unit, and process the print data to not generate print data corresponding to the advertisement web page.

According to an aspect of the present invention, the method may further include displaying, by the host apparatus, a printing menu to adjust printing information regarding the print data.

According to an aspect of the present invention, there is provided a printing method of an image forming apparatus capable of printing out a web page displayed on a host apparatus, the method including, if an input key to input a command for printing out a web page is selected, transmitting the command for printing out the web page to the host apparatus; converting, by the host apparatus, the web page into printable data according to the command for printing out a web page; converting, by the image forming apparatus, the printable data to fit onto the printable medium; and printing out the printable data on the printable medium.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
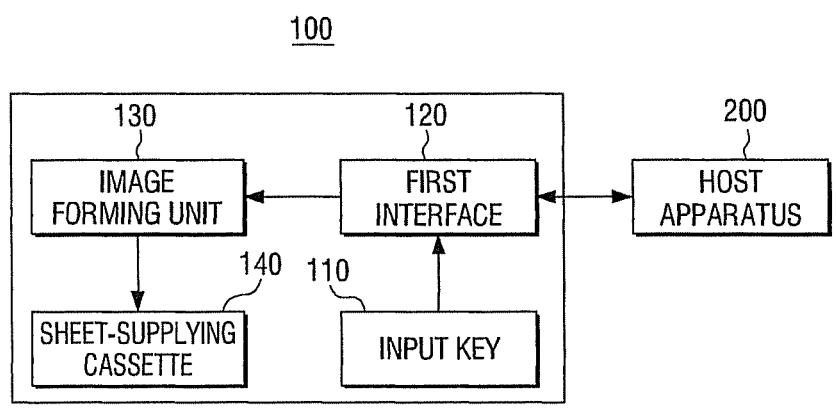
FIG. 1 is a block diagram of an image forming apparatus according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an image forming apparatus according to a present embodiment of the present invention. Referring to FIG. 1, an image forming apparatus 100 may include an input key 110, a first interface 120, an image forming unit 130, and a sheet-supplying cassette 140.

The image forming apparatus 100 can be, for example, a printer, a scanner, a copy machine, a fax machine, a multi-function peripheral (MFP) combining these machines, or the like.

The image forming apparatus 100 is connected to a host apparatus 200, and prints out a web page displayed on the host apparatus 200. The host apparatus 200 may be, for example, a display apparatus to download a web page from a web server provided on a personal computer (PC), a personal digital assistant (PDA), a mobile phone capable of displaying the downloaded web page, a remote terminal, a client terminal, a mobile computing device, a mobile telecommunications device, or the like.

The web page is provided by a web server (not shown), and may include multimedia, including text, graphic images, audio, or moving pictures, and may also include sub link information to image files or moving picture files linked with a main page. The web page may include at least one document to be downloaded, for example an official form, a transaction record, an official record, an education manual, or a map.

The input key 110 provided on the image forming apparatus 100 may be used to receive a command for printing out a web page, and may be formed on an external surface of the image forming apparatus 100 as a single button. Accordingly, a user can easily print out a web page by pressing the button once.

The first interface 120 performs data communication between the image forming apparatus 100 and the host apparatus 200. Specifically, if the input key 110 is selected, the first interface 120 transmits a command for printing out a web page to the host apparatus 200, and receives print data which are converted to fit onto a printable medium stored on the sheet-supplying cassette 140. The printable medium may be printing paper, transparencies, photograph film, other stationary, or various types of media providing the same function as the printing paper as occasion demands. Hereinafter, the exemplary printable medium is printing paper for convenience of description.

The print data, converted to fit onto the printable medium, may be data in which at least one web page is processed in order to be printed on a single printable medium. Alternatively, the data may be processed such that one or more web pages are divided between a plurality of printable media.

The first interface 120 transmits apparatus information corresponding to the image forming apparatus 100, together with a command for printing out a web page to the host apparatus 200. Then, the host apparatus 200 determines the image forming apparatus 100 which requests a web page to be printed out, selects a printer driver (not shown) corresponding to the determined image forming apparatus 100, and causes the printer driver to operate. The first interface 120 transmits information regarding the paper size used in the image forming apparatus 100 to the host apparatus 200, and causes the host apparatus 200 to operate appropriately. The image forming unit 130 prints out web page data received through the first interface 120 onto a printable medium.

Figure 2:
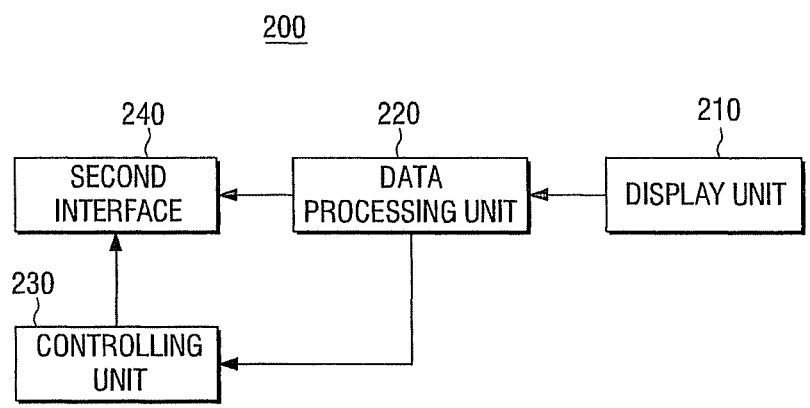
FIG. 2 is a block diagram of a host apparatus according to an exemplary embodiment of the present invention.

FIG. 2 is a block diagram of an image forming apparatus 100 and a host apparatus 200 according to a present embodiment of the present invention. Referring to FIG. 2, the host apparatus 200 may include a display unit 210, a data processing unit 220, a controlling unit 230, and a second interface 240.

The host apparatus 200 may be implemented as a PC, PDA, a client terminal, a mobile computing device or mobile phone on which a web browser, such as Internet Explorer or Netscape, may be displayed, information may be searched for using web sites connected to an external network through an Internet router (not shown), searched web pages may be browsed, and the web page may be displayed on a screen. The web pages may be displayed as a plurality of windows or as a single window in a tabbed format.

The second interface 240 may receive a command for printing out a web page from the image forming apparatus 100 of FIG. 1. The second interface 240 transmits print data generated by the host apparatus 200 to the image forming apparatus 100 in response to the command for printing out a web page.

The display unit 210 may display a web page which is browsed at a web site using a web browser. The display unit 210 may display a screen displaying various operations provided by the host apparatus 200. The display unit 210 may be implemented as a Liquid Crystal Display (LCD), and may also use a Cathode-Ray Tube (CRT), a Plasma Display Panel (PDP), or Organic Light Emitting Diode (OLED) or other such devices as occasion demands.

The data processing unit 220 automatically adjusts a web page displayed on the display unit 210, to fit onto a printable medium, and generates print data if a command for printing out a web page is input on the image forming apparatus 100 of FIG. 1. The detailed description of the data processing unit 220 will be explained below with reference to FIG. 3.

The controlling unit 230 controls overall operations of the host apparatus 200 according to a program stored in a storage unit (not shown). Specifically, the controlling unit 230 controls the data processing unit 220 to generate print data in response to a command for printing out a web page transmitted from the image forming apparatus 100. The controlling unit 230 transmits the generated print data to the image forming apparatus 100, and controls the image forming apparatus 100 to print out the print data.

The storage unit (not shown) may be implemented as a Read-Only Memory (ROM) or a Random Access Memory (RAM). The ROM is a non-volatile storage, and stores various controlling programs required to conduct the functions of the host apparatus 200. The RAM is a volatile storage, and temporarily stores data to conduct programs of the controlling unit 130.

Figure 3:
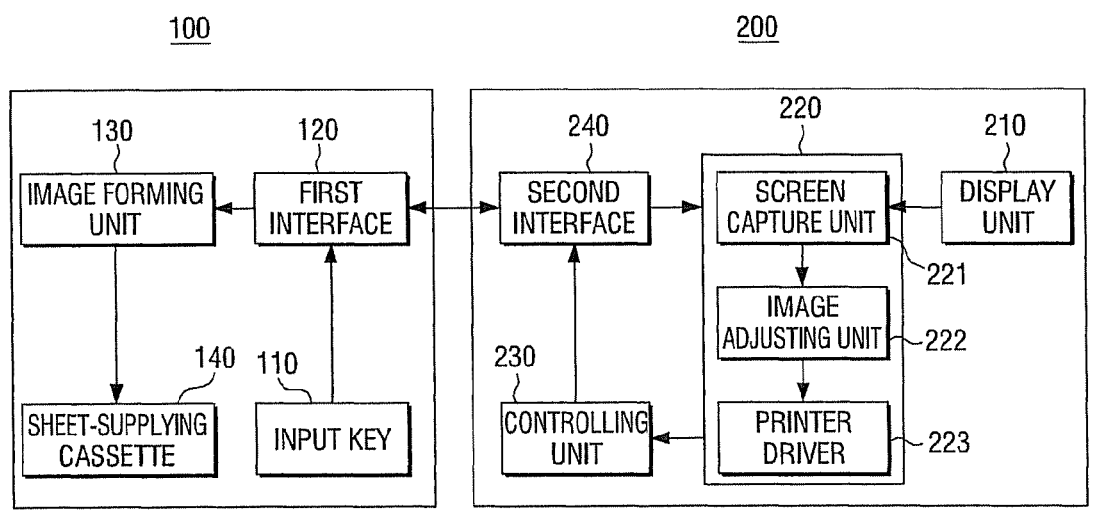
FIG. 3 is a detailed block diagram of the image forming apparatus and the host apparatus of FIGS. 1 and 2.

FIG. 3 is a detailed block diagram of the image forming apparatus and the host apparatus 200 of FIGS. 1 and 2. Referring to FIG. 1, the image forming apparatus 100 may include the input key 110, the first interface 120, the image forming unit 130, and the sheet-supplying cassette 140. Referring to FIG. 2, the host apparatus 200 may include the display unit 210, the data processing unit 220, the controlling unit 230, and the second interface 240. The data processing unit 220 provided on the host apparatus 200 may include a screen capture unit 221, an image adjusting unit 222, and a printer driver 223. Elements common to FIGS. 1 and 2 will not be explained in detail.

The second interface 240 provided on the host apparatus 200 may perform data communication with the first interface provided on the image forming apparatus 100.

If a command for printing out a web page is input through the second interface 220, the screen capture unit 220 performs a scroll capture on a web page displayed on the display unit 210. That is, the screen capture unit 220 performs the scroll capture on a corresponding web page from a vertical start position to a vertical end position and from a horizontal start position to a horizontal end position. The command for printing out a web page may be input through the input key 110 provided on the image forming apparatus 100.

The storage unit (not shown) may convert data of the web page scrolled and captured by the screen capture unit 220, into a bitmap file or a Portable Document Format (PDF) file, and store the converted files.

The image adjusting unit 222 may adjust the data of the web page scrolled and captured by the screen capture unit 220, to fit onto a printable medium. The image adjusting unit 222 adjusts the size of the web page data such that all of the selected web page is included on a single printable medium or all of the selected web page is divided and included on a plurality of printable media. The above operation may vary according to the setting of printable medium or the amount of the web page data. The printable medium may be preset to a default medium or may be selected by a user. The amount of the web page data to be printed out on a single printable medium may be set to a default setting or may be selected by a user.

The printer driver 223 may convert the web page data, adjusted by the image adjusting unit 222, into print data capable of being recognized on the image forming apparatus 100. The printer driver 223 divides the web page data by a page unit, and appropriately processes data or a controlling code contained in the print data for a single page to convert the data or controlling code into data capable of being recognized on the image forming apparatus 100.

The controlling unit 230 closely controls the data processing unit 220. The controlling unit 230 transmits the web page print data generated by the printer driver 223 to the image forming apparatus 100, and controls the image forming apparatus 100 to print out the web page print data.

The controlling unit 230 periodically polls information of the image forming apparatus 100, and determines whether the input key 110 is selected. However, this is merely an exemplary embodiment. If the input key 110 of the image forming apparatus 100 is selected, a command for printing out a web page may be transmitted to the controlling unit 230.

If a plurality of web pages is displayed on the display unit 210, the controlling unit 230 may transmit the print data of a foremost web page among the plurality of web pages to the image forming apparatus 100. If a plurality of web pages is displayed on the display unit 210, the controlling unit 230 may also transmit the print data of all of the web pages to the image forming apparatus 100. If a plurality of web pages is displayed on the display unit 210, information regarding the print data according to the command for printing out a web page may be preset.

The display unit 210 provides a printing menu to adjust information regarding printing out web page data such that a user may select a desired menu. The information regarding printing out web page data may include a file to be printed, the size of the file, the number of copies to be printed, paper information, the basic printing format, an enlargement or reduction ratio, or the like.

The controlling unit 230 determines characteristics of a web page displayed on the display unit 210, and controls the data processing unit 220 according to the determined characteristics. If a web page displayed on the display unit 210 is an advertisement web page, then the controlling unit 230 controls the data processing unit 220 to not generate web page data corresponding to the advertisement web page. Accordingly, the advertisement web page is not printed. The advertisement web page may be, for example, a banner, a flash animation, a moving picture, text, an image or other such multimedia. The controlling unit 230 distinguishes such an advertisement web page, and causes the advertisement web page to be not printed. A method for distinguishing an advertisement web page is known in the related art, therefore a detailed description will be omitted.

Figure 4:
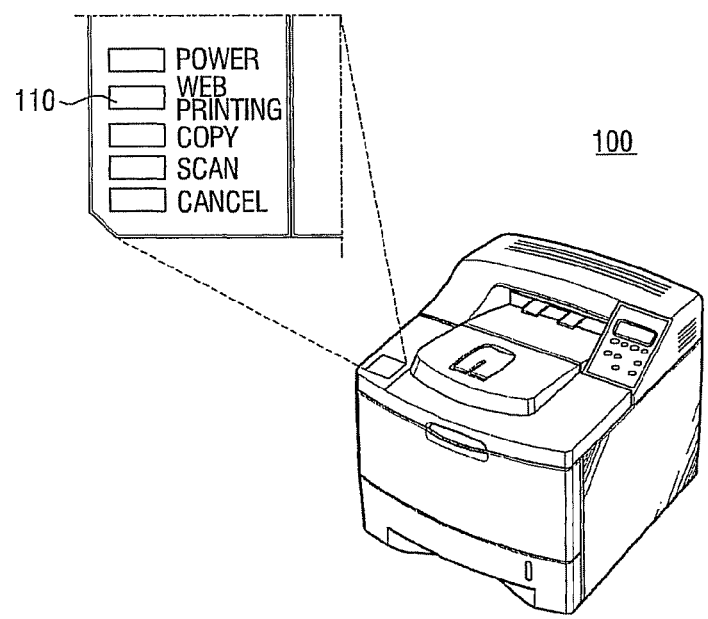
FIG. 4 is a perspective view of input keys provided on an image forming apparatus according to an exemplary embodiment of the present invention.

FIG. 4 is a perspective view of input keys provided on an image forming apparatus according to an exemplary embodiment of the present invention. Referring to FIG. 4, the input key 110 to print out a web page may be formed as a single button on an input panel provided on an external surface of the image forming apparatus 100. Accordingly, a user can easily print out a web page by pressing the button once.

Figure 5:
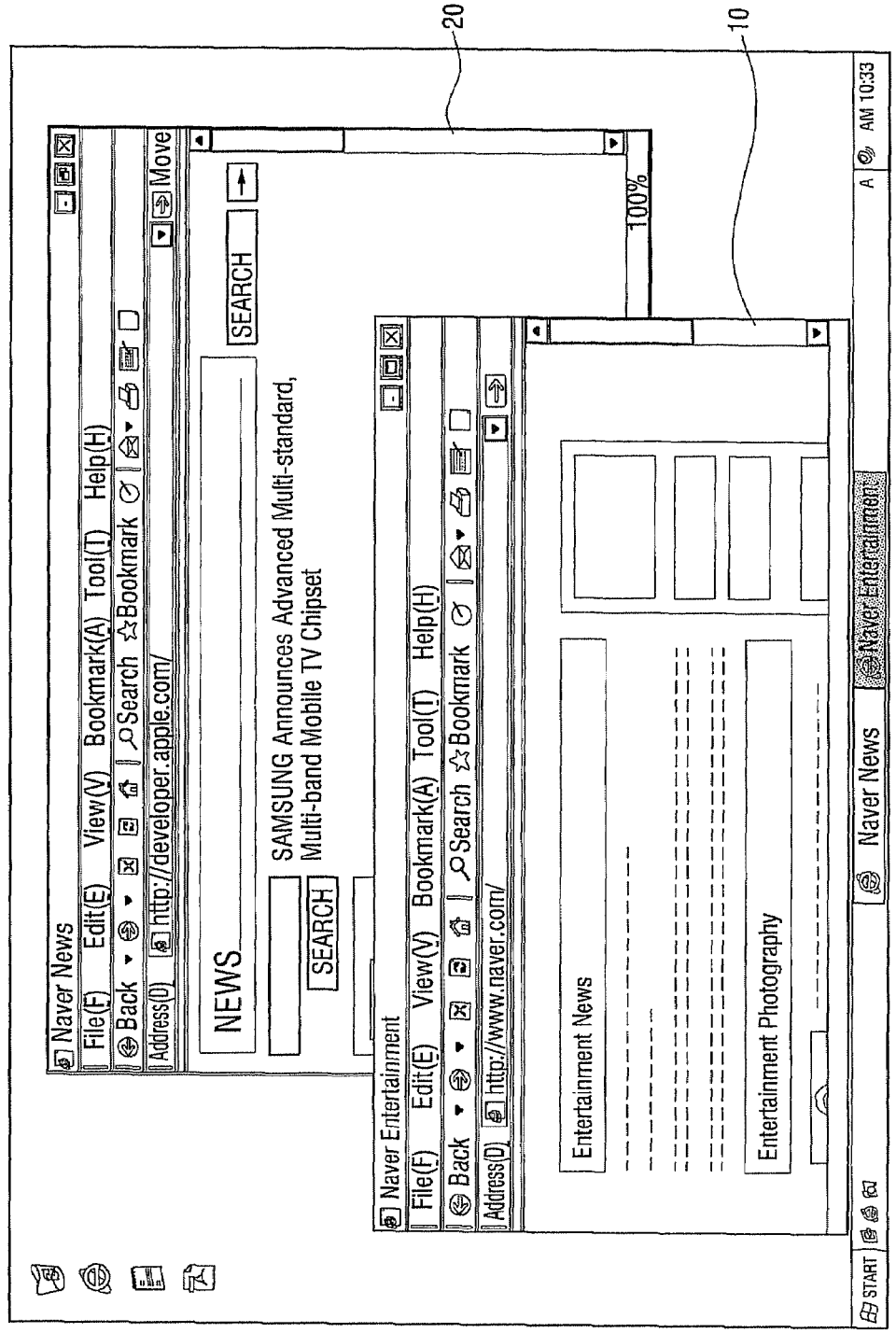
FIG. 5 is a view provided to explain the process of printing out a web page according to an exemplary embodiment of the present invention.

FIG. 5 is a view provided to explain the process of printing out a web page according to an exemplary embodiment of the present invention. Referring to FIG. 5, if a plurality of web pages are displayed on the display unit 210, and if the input key 110 of the image forming apparatus is selected, the image forming apparatus 100 may print out the print data of a foremost web page 10 among the plurality of web pages or the print data of all of the plurality of web pages 10, 20. In this case, a default value may be set to print out the print data of the foremost web page 10 or may be set to print out the print data of all of the plurality of web pages 10, 20.

Figure 6:
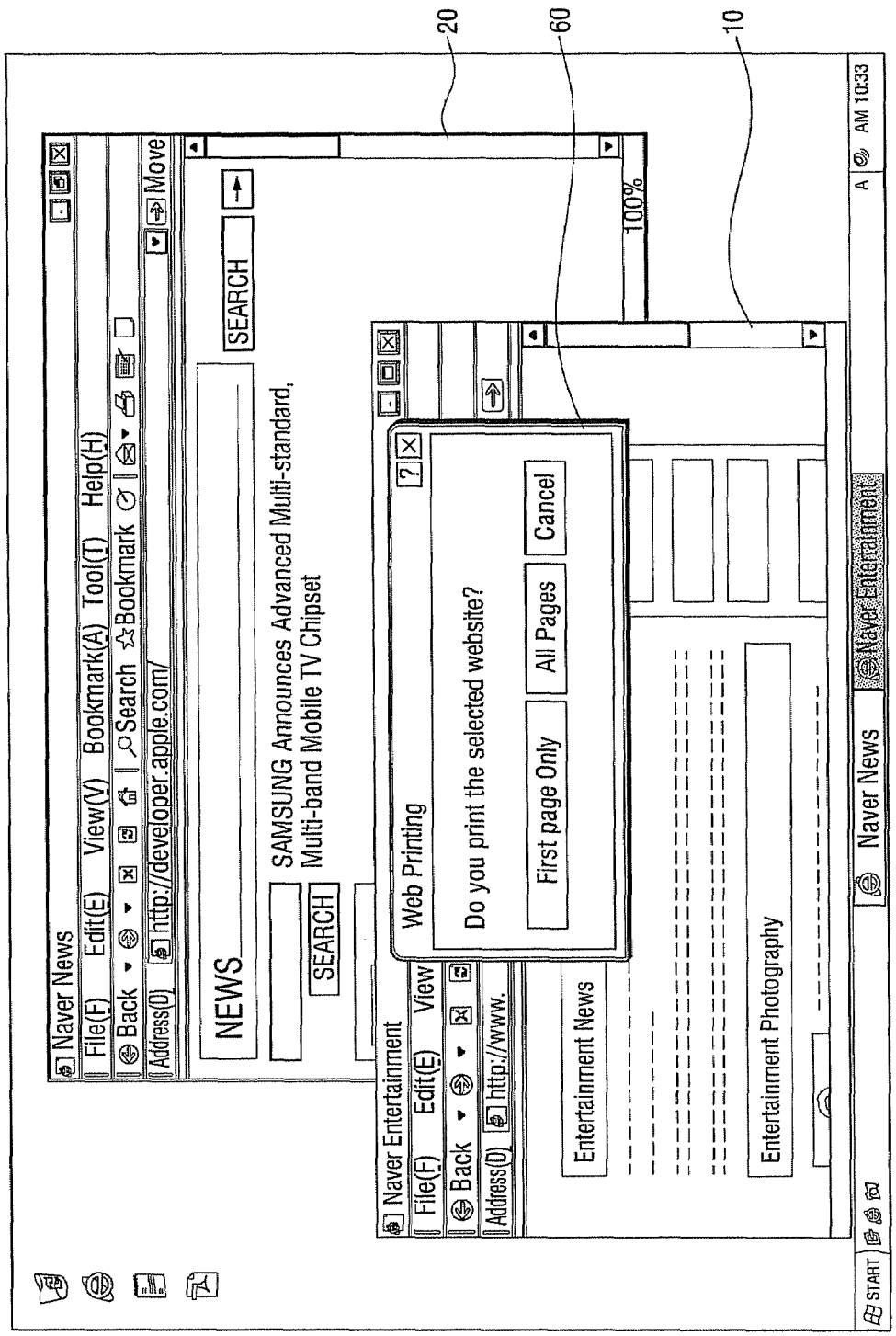
FIG. 6 is a view provided to explain the process of printing out a web page according to another exemplary embodiment of the present invention.

FIG. 6 is a view provided to explain the process of printing out a web page according to another exemplary embodiment of the present invention.

Referring to FIG. 6, if a plurality of web pages is displayed on the display unit 210, and if the input key 110 of the image forming apparatus is selected, a popup window 60, such as a dialog or an application window, may be provided such that a user may select a web page to be printed. The user may select whether to print out web page data for a foremost web page or web page data for all of the plurality of web pages using the popup window 60.

Figure 7A:
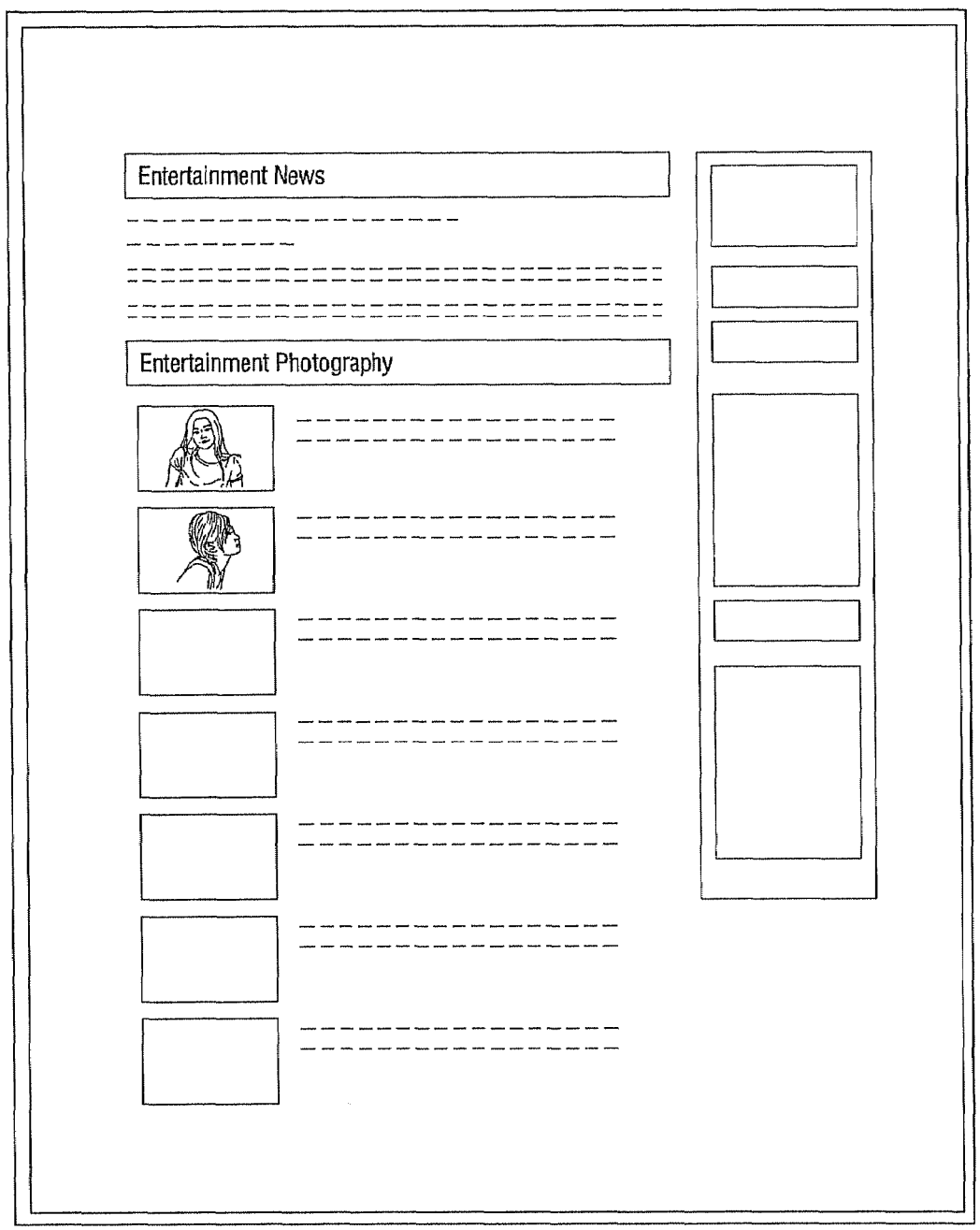
FIGS. 7A and 7B are views provided to explain the result of a printed web page according to another exemplary embodiment of the present invention.
Figure 7B:
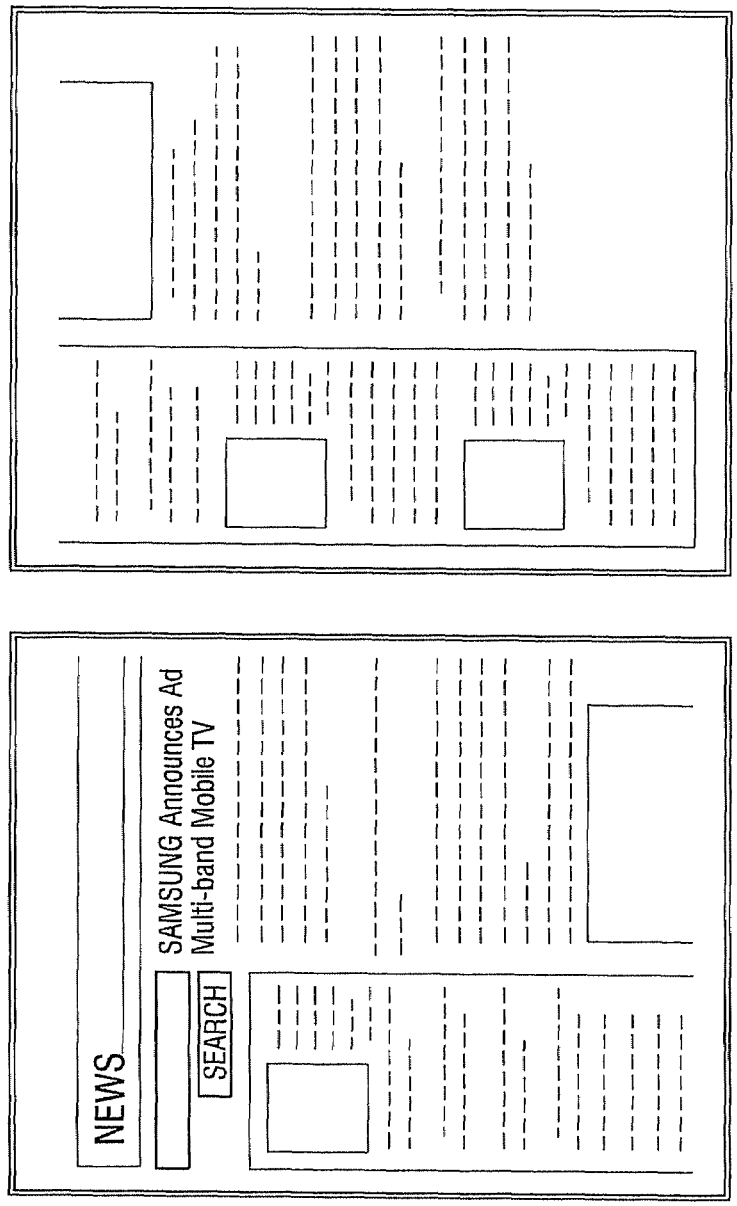

FIGS. 7A and 7B are views provided to explain the result of a printed web page according to another exemplary embodiment of the present invention. Referring to FIG. 7A, a single web page is printed out on a single printable medium, which is made possible by automatically adjusting the size of the web page to be printed to fit onto a single printable medium. Referring to FIG. 7B, a single web page is divided and printed out on two printable media. If it is preset that a single web page is divided and printed out on two printable media, or if the amount of a web page displayed on a single printable medium is predetermined, it is possible for a single web page to be divided and printed out on two printable media.

While a single web page is divided and printed out on two printable media in this present embodiment of the present invention, this is merely a present embodiment of the present invention. Alternatively, a single web page may also be divided and printed out on three or more printable media as occasion demands.

Figure 8A:
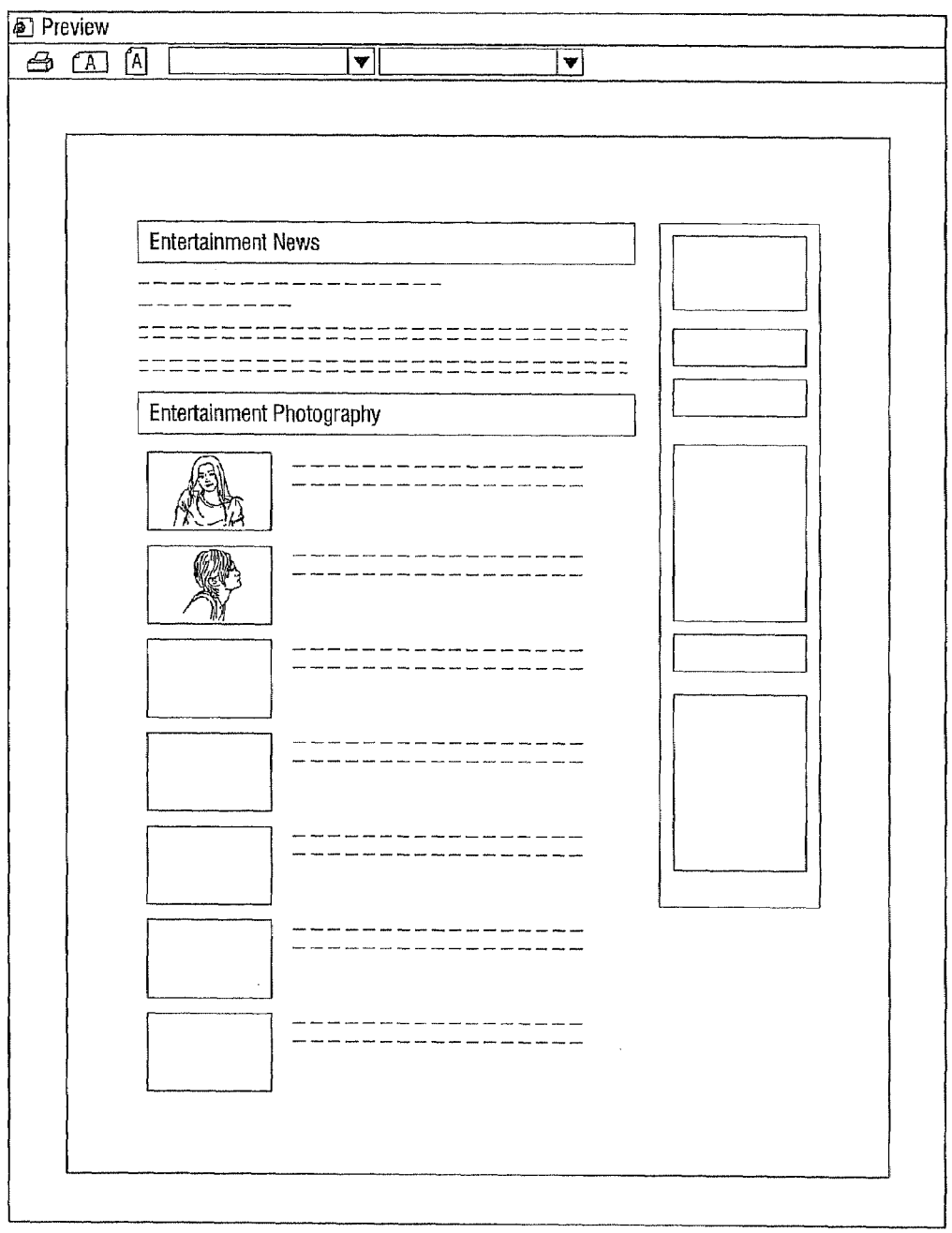
FIGS. 8A and 8B are views provided to explain the case in which a preview is provided according to an exemplary embodiment of the present invention.
Figure 8B:
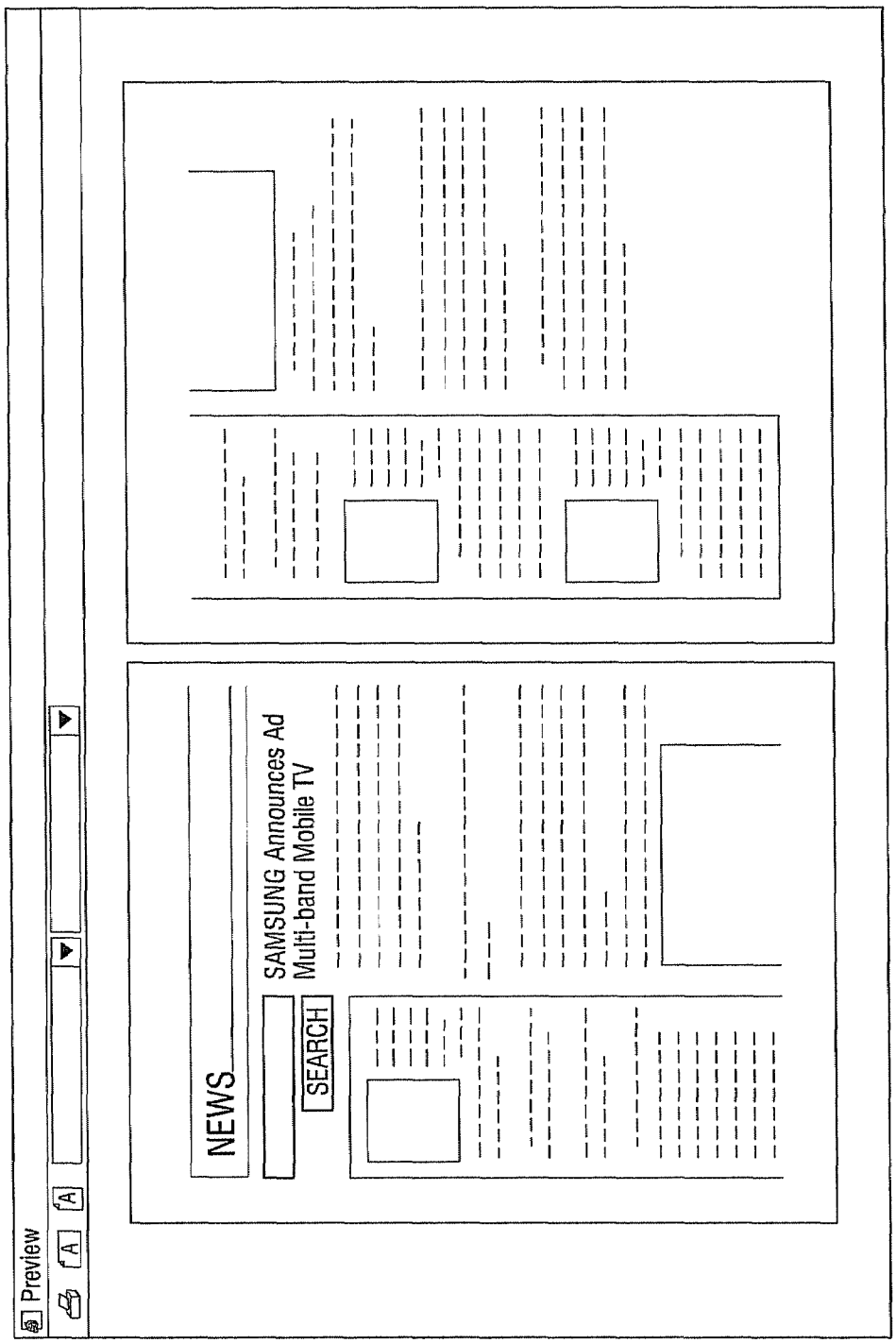

FIGS. 8A and 8B are views provided to explain the case of providing a preview according to a present embodiment of the present invention. According to another present embodiment of the present invention, a web page may be printed out in response to a command for printing out a web page without providing a preview of the web page to be printed out. However, a preview of a web page to be printed out may be provided before the web page is produced in its final form as shown in FIGS. 8A and 8B. Accordingly, a user can check the final form of a web page to be printed out.

FIG. 8A illustrates a preview of a single web page when the web page is printed out on a single printable medium, and FIG. 8B illustrates a preview of a plurality of web pages when the web pages are divided and printed out on a plurality of printable media. Alternatively, if a plurality of web pages is printed on a plurality of printable medium, respectively, previews may be displayed in the same manner.

Figure 9:
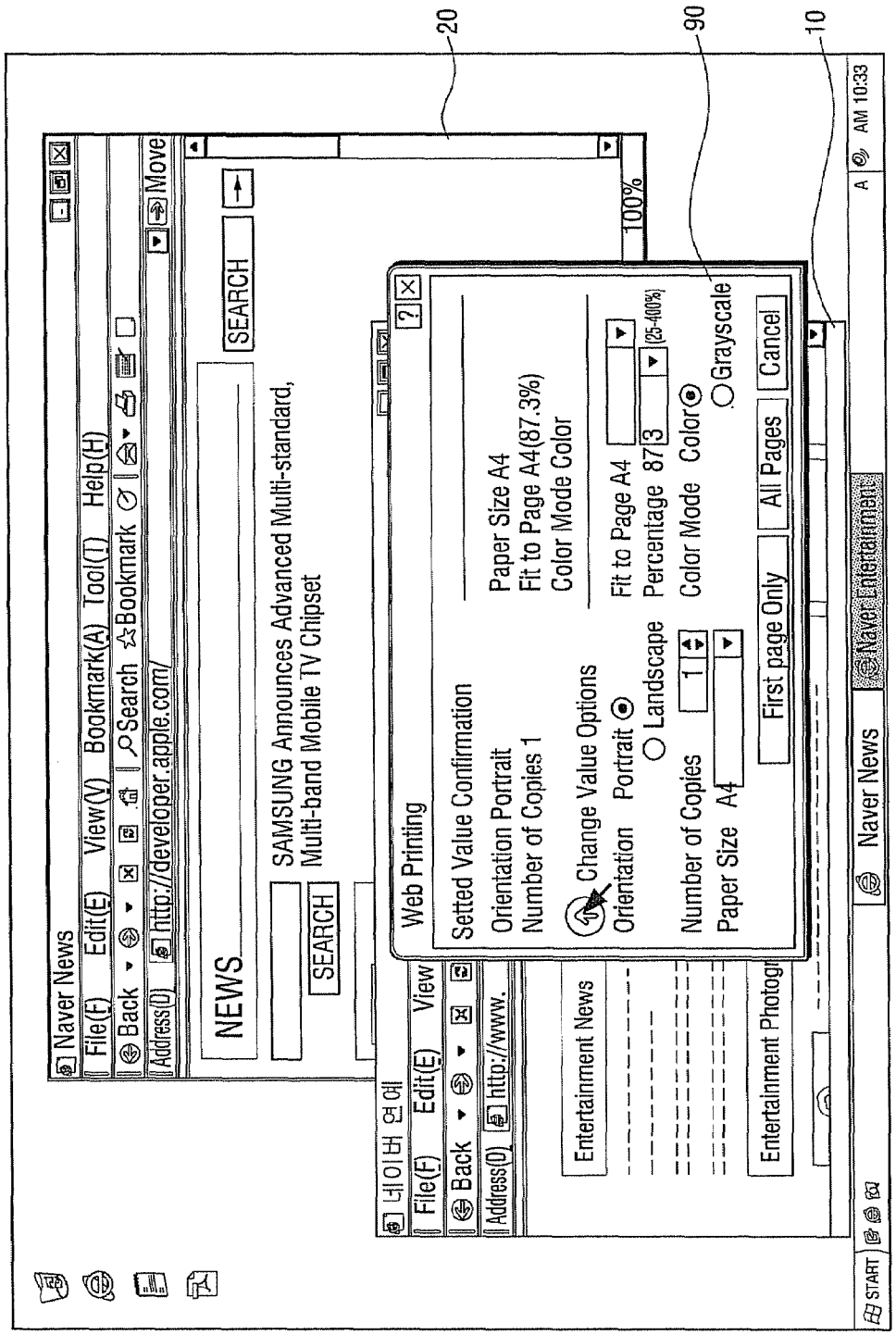
FIG. 9 is a view provided to explain the case in which a printing menu is provided to adjust printing information according to an exemplary embodiment of the present invention.

FIG. 9 is a view provided to explain the case of providing a printing menu to adjust printing information according to an exemplary embodiment of the present invention. Referring to FIG. 9, if the input key 110 of the image forming apparatus 100 is selected, a menu window 90 to control printing information may be displayed. The printing information may include the basic printing format, the number of copies, paper information, an enlargement or reduction ratio, a color mode, or the like. A user may check or change the information displayed on the menu window 90, the size of the file, the number of copies to be printed, paper information, or other such information.

Figure 10:
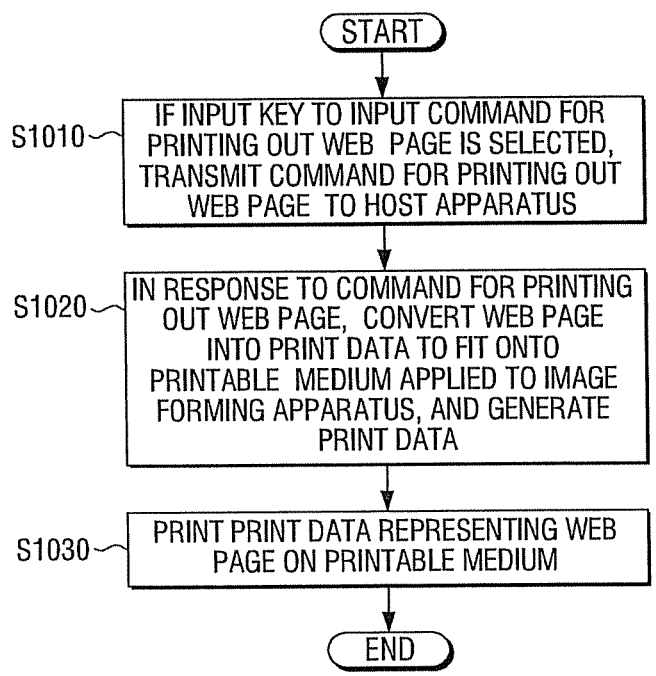
FIG. 10 is a flowchart illustrating the process of printing out a web page according to an exemplary embodiment of the present invention.

FIG. 10 is a flowchart of the process of printing out a web page according to a present embodiment of the present invention. According to a printing method of an image forming apparatus to print out a web page displayed on the host apparatus 200 illustrated in FIG. 1, if an input key to input a command for printing out a web page is selected, the command for printing out a web page is transmitted to the host apparatus 200 in operation S1010. In response to the command for printing out a web page, the host apparatus 200 converts the web page into web page data to fit onto a printable medium disposed at the image forming apparatus, and generates print data in operation S1020.

The image forming apparatus prints out the print data on the printable medium in operation S1030. In operation S1030, the web page data converted to fit onto the printable medium may be processed to be included in a single printable medium or to be divided and included on a plurality of printable media.

In operation S1010, at least one of either apparatus information corresponding to the image forming apparatus or information regarding the size of a printable medium may also be transmitted together with the command for printing out a web page. In operation S1020, at least one web page may be included in a single printable medium, or divided and included on a plurality of printable media.

A host apparatus 200 may periodically poll information of the image forming apparatus, and determine whether the input key is selected or not.

In operation S1020, a scroll capture may be performed on the displayed web page, the web page on which the scroll capture is performed may be adjusted to fit onto a printable medium, and the adjusted web page may be converted to print data capable of being printed out.

If a plurality of web pages is displayed, the print data of a foremost web page among the plurality of web pages may be transmitted to the image forming apparatus, or the print data of all of the plurality of web pages may be transmitted to the image forming apparatus. If the web page is determined to be advertisement web page, the web page corresponding to the advertisement web page may be not generated.

A printing menu to adjust information for printing out web page data is displayed, and thus a user can check or change the printing information. The printing information may include the basic printing format, the number of copies, paper information, an enlargement or reduction ratio, a color mode, or the like.

Figure 11:
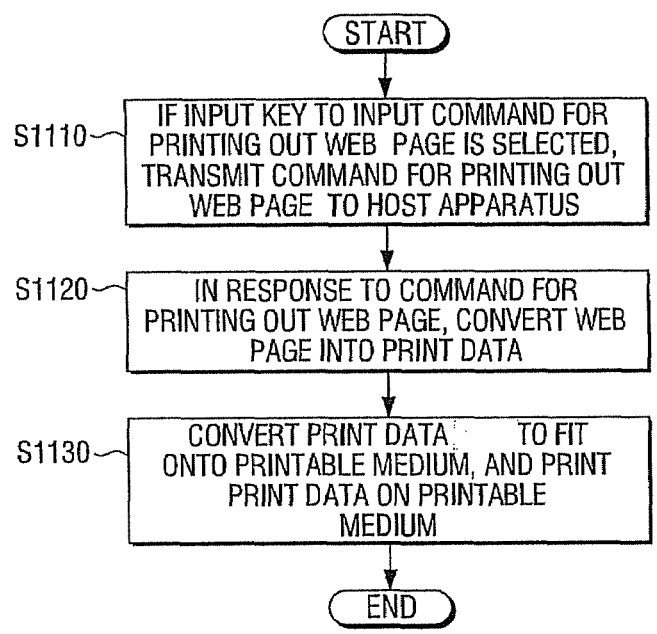
FIG. 11 is a flowchart illustrating the process of printing out a web page according to another exemplary embodiment of the present invention.

FIG. 11 is a flowchart of the process of printing out a web page according to another present embodiment of the present invention. According to a printing method of an image forming apparatus to print out a web page displayed on the host apparatus 200 illustrated in FIG. 1, if an input key to input a command for printing out a web page is selected, the command for printing out a web page is transmitted to a host apparatus 200 in operation S1110. In response to the command for printing out a web page, the host apparatus 200 converts the web page into printable data in operation S1120. The image forming apparatus converts the print data to fit onto a printable medium, and prints out the converted print data on the printable medium in operation S1130.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the plurality of web pages may be displayed in a single window on a display unit in a tabbed browsing format, or a web page or a plurality of web pages can be displayed through applications other than web browsers, such as mapping applications, video applications, interactive music applications, etc. Accordingly, it is intended, therefore, that the present invention not be limited to the various example embodiments disclosed, but that the present invention includes all embodiments falling within the scope of the appended claims.

What is claimed is:

1. An image forming apparatus capable of printing out a web page displayed on a host apparatus, the image forming apparatus comprising:
   an input key to input a command to print out the web page;
   an interface to transmit the command to the host apparatus and to receive print data of a screen of the web page captured and adjusted to fit onto a printable medium by the host apparatus; and
   an image forming unit to print the received print data on the printable medium;
   wherein the interface transmits at least one of device information corresponding to the image forming apparatus and information regarding the size of a printable medium together with the command to print out the web page;
   wherein if multiple web pages are displayed on the host apparatus, a user is provided with an option as to which of the web pages are to be captured and printed.

2. The apparatus according to claim 1, wherein the print data is captured from the web page currently displayed on a display unit of the host apparatus as it is.

3. The apparatus according to claim 1, wherein the print data is generated by the performing a scroll capture on the entire web page displayed on the display unit of the host apparatus and converting the scroll captured web page to fit onto the printable medium.

4. The apparatus according to claim 1, wherein the print data is processed in such a manner that the web page is included in a printing area of a single printable medium or dividedly included in printing areas of a plurality of printable media.

5. A host apparatus, comprising:
   an interface to receive a command to print out a web page and at least one of device information corresponding to image forming apparatus and information regarding the size of printable medium from an image forming apparatus, in response to an input key of the image forming apparatus being selected;
   a display unit to display a web page;
   a print data processing unit to capture a screen of a web page displayed on the display unit and adjust the captured screen of the web page to fit onto a printable medium and generate print data using the adjusted screen, if the command to print out the web page is received; and
   a controlling unit to transmit the print data generated by the print data processing unit to the image forming apparatus and control the image forming apparatus to print the print data;
   wherein when multiple web pages are displayed by the display unit, a user is provided with an option as to which of the web pages are to be captured and printed, when the command to print out the web page is received.

6. The host apparatus according to claim 5, wherein the print data processing unit generates the print data by capturing the web page currently displayed on the display unit as it is.

7. The host apparatus according to claim 5, wherein the print data processing unit generates the print data by performing a scroll capture on the entire web page displayed on the display unit and converting the scroll captured web page to fit onto the printable medium.

8. The host apparatus according to claim 5, wherein the print data processing unit processes so that at least one web page is included in a printing area of a single printable medium or dividedly included in printing areas of a plurality of printable media.

9. The host apparatus according to claim 5, wherein the print data processing unit comprises:
   a screen capture unit to capture the web page displayed on the display unit;
   an image adjusting unit to adjust data of the captured web page to fit onto a printing area; and
   a printer driver to convert the adjusted data into printable data.

10. The host apparatus according to claim 5, wherein if a plurality of web pages are displayed on the display unit, the controlling unit transmits print data of a foremost web page among the plurality of web pages or transmits print data of each web page to the image forming apparatus.

11. The host apparatus according to claim 5, wherein the controlling unit determines characteristics of the web page displayed on the display unit, and, if the web page is determined as an advertisement web page, controls the print data processing unit not to generate the print data corresponding to the advertisement web page.

12. The host apparatus according to claim 5, wherein the display unit displays a printing menu to adjust printing information regarding the print data.

13. A printing method of an image forming apparatus capable of printing out a web page displayed on a host apparatus, the method comprising the steps of:
   in response to an input key to input a command to print out a web page being selected, transmitting the command to print out the web page to the host apparatus;
   capturing a screen of a currently displayed web page according to the command to print out the web page and adjusting the captured screen of the web page to fit onto a printable medium and generating print data using the adjusted screen, by the host apparatus; and
   printing the print data on the printable medium, by the image forming apparatus;
   wherein the transmitting the command to print out the web page transmits at least one of device information corresponding to the image forming apparatus and information regarding the size of a printable medium together with the command to print out the web page;
   wherein when multiple web pages are displayed on the host apparatus, a user is provided with an option as to which of the web pages are to be captured and printed;
   wherein the steps are executed by a processor.

14. The method according to claim 13, wherein the print data is generated by the operation of capturing the web page currently displayed on the display unit of the host apparatus as it is.

15. The method according to claim 13, wherein the print data is generated by the operation of performing a scroll capture on the entire web page currently displayed on the display unit of the host apparatus and converting the scroll captured web page to fit onto the printable medium applied to the image forming apparatus.

16. The method according to claim 13, wherein the converted print data is processed so that at least one web page is included in a printing area of a single printable medium or dividedly included in printing areas of a plurality of printable media.

17. The method according to claim 13, wherein the generating print data comprises:
   performing a scroll capture on the displayed web page;
   adjusting the scroll captured web page data to fit onto a printing area; and
   converting the adjusted scroll captured web page data into print data.

18. The method according to claim 13, wherein the generating print data, if a plurality of web pages are displayed on the display unit, generates print data of a foremost web page among the plurality of web pages or generates print data of each web page.

19. The method according to claim 13, wherein the generating print data determines characteristics of the displayed web page, and, if the web page is determined as an advertisement web page, does not generate the print data corresponding to the advertisement web page.

20. The method according to claim 13, further comprising:
   displaying a printing menu to adjust printing information regarding the print data, by the host apparatus.

21. A printing method of an image forming apparatus capable of printing out a web page displayed on a host apparatus, the method comprising the steps of:
   in response to an input key to input a command to print out a web page being selected, transmitting the command to print out the web page and at least one of device information corresponding to the image forming apparatus and information regarding the size of printable medium to the host apparatus;
   capturing a screen from a currently displayed web page in the host apparatus;
   converting the screen into print data according to the command to print out the web page, by the host apparatus;
   transmitting the converted print data from the host apparatus to the image forming apparatus;
   converting the print data to fit onto a printable medium using information regarding the size of the printable medium stored on the image forming apparatus, by the image forming apparatus; and
   printing the print data converted to fit onto the printable medium on the printable medium;
   wherein when multiple web pages are displayed on the host apparatus, a user is provided with an option as to which of the web pages are to be captured and printed;
   wherein the steps are executed by a processor.

22. The host apparatus according to claim 5, wherein the controlling unit periodically polls device information of the image forming apparatus, and determines whether an input key is selected.

23. The method according to claim 13, further comprising:
   receiving a polling signal for determining whether the command to print out the web page is received, from the host apparatus.

24. The apparatus according to claim 1, wherein the interface receives, from the host apparatus, a polling signal for determining whether an input key is selected.

* * * * *